(12) United States Patent
Zhang et al.

(10) Patent No.: US 10,224,582 B2
(45) Date of Patent: Mar. 5, 2019

(54) ELECTROCHEMICAL SECONDARY BATTERY HAVING INBUILT CHARGING CIRCUIT

(71) Applicant: FUJIAN NANPING NANFU BATTERY CO., LTD., Nanping, Fujian (CN)

(72) Inventors: Qingshun Zhang, Fujian (CN); Jintian Chen, Fujian (CN); Haitao Chang, Fujian (CN); Zhiming Zhang, Fujian (CN); Sheng Su, Fujian (CN)

(73) Assignee: FUJIAN NANPING NANFU BATTERY CO., LTD, Nanping, Fujian (CN)

( * ) Notice: Subject to any disclaimer, the term of this patent is extended or adjusted under 35 U.S.C. 154(b) by 0 days.

(21) Appl. No.: 15/808,085

(22) Filed: Nov. 9, 2017

(65) Prior Publication Data

US 2018/0069273 A1 Mar. 8, 2018

Related U.S. Application Data

(63) Continuation of application No. PCT/CN2015/096617, filed on Dec. 8, 2015.

(30) Foreign Application Priority Data

Jun. 12, 2015 (CN) .......................... 2015 1 0322920
Jun. 12, 2015 (CN) ..................... 2015 2 0404032 U

(51) Int. Cl.
*H02J 7/00* (2006.01)
*H01M 10/46* (2006.01)
(Continued)

(52) U.S. Cl.
CPC ............. *H01M 10/46* (2013.01); *H01M 2/02* (2013.01); *H01M 2/022* (2013.01);
(Continued)

(58) Field of Classification Search
USPC .......................................................... 320/107
See application file for complete search history.

(56) References Cited

U.S. PATENT DOCUMENTS 4,992,339 A * 2/1991 Georgopoulos ........ H01M 2/34
429/62
2009/0130544 A1 5/2009 Chang et al.

FOREIGN PATENT DOCUMENTS

CN 101425609 A 5/2009
CN 102044696 A 5/2011
(Continued)

OTHER PUBLICATIONS

International Search Report of PCT/CN2015/096617, dated Feb. 24, 2016.

*Primary Examiner* — Robert Grant
(74) *Attorney, Agent, or Firm* — Locke Lord LLP; Tim Tingkang Xia, Esq.

(57) ABSTRACT

An electrochemical secondary battery (100) having an inbuilt charging circuit comprises a battery housing (101), a battery cell (102), a positive electrode cap (105), a negative electrode cap (103), a circuit board module (104), and an insulating washer (106). A recessed loop line (107) structure is provided at an end of the battery housing (100) in proximity to the negative electrode cap (103). The battery cell (102) is arranged within the battery housing (101) and arranged between the positive electrode cap (105) and the loop line (107) structure. The positive electrode cap (105) is connected to the battery housing (101) to constitute the positive electrode of the secondary battery. The negative electrode cap (103) is arranged on the circuit board module (104). The circuit board module (104) is arranged between the loop line (107) and the negative electrode cap (103).

10 Claims, 5 Drawing Sheets

(51) Int. Cl.
*H01M 2/02* (2006.01)
*H01M 10/42* (2006.01)
*H01M 2/04* (2006.01)
*H01M 2/10* (2006.01)

(52) U.S. Cl.
CPC ....... *H01M 2/0413* (2013.01); *H01M 2/1094* (2013.01); *H01M 10/425* (2013.01); *H01M 10/4257* (2013.01); *H02J 7/0029* (2013.01); *H02J 7/0047* (2013.01); *H01M 2220/30* (2013.01)

(56) References Cited

FOREIGN PATENT DOCUMENTS

| | | |
|---|---|---|
| CN | 104934553 A | 9/2015 |
| CN | 204668364 U | 9/2015 |

* cited by examiner

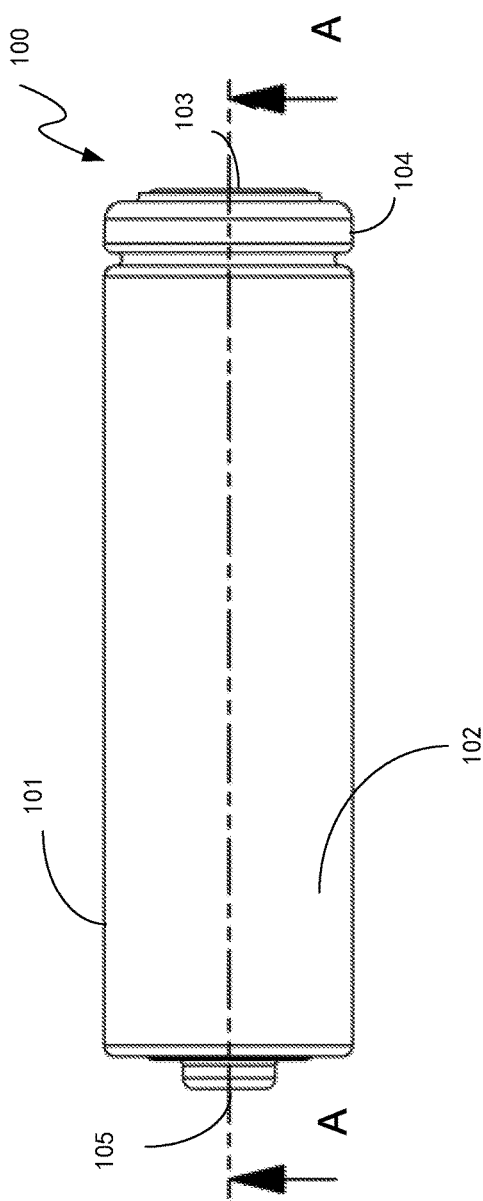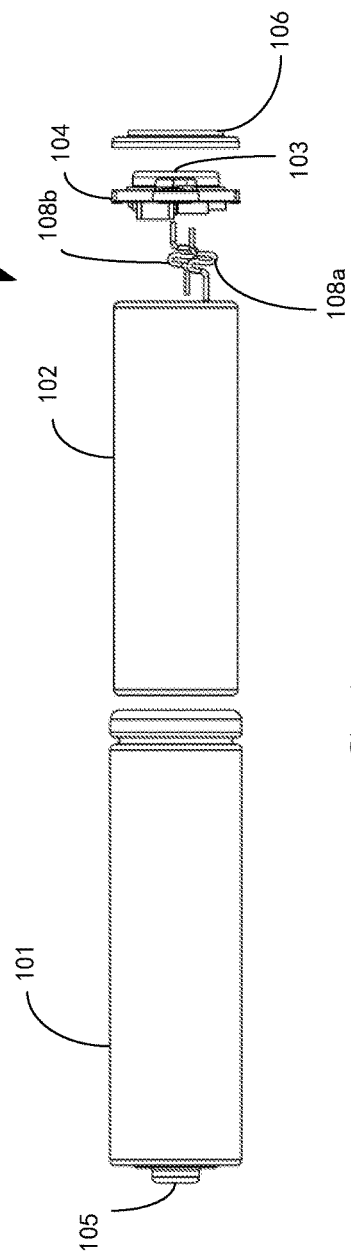
FIG. 1A
FIG. 1B

ELECTROCHEMICAL SECONDARY BATTERY HAVING INBUILT CHARGING CIRCUIT

CROSS-REFERENCE TO RELATED PATENT APPLICATION

This application is a continuation application of International Patent Application No. PCT/CN2015/096617, filed on Dec. 8, 2015, which itself claims priority to Chinese Patent Application Nos. CN201520404032.8 and CN201510322920.X, both filed in P.R. China on Jun. 12, 2015. The entire contents of the above applications are incorporated herein in their entireties by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a secondary battery, and particularly to an electrochemical secondary battery having an inbuilt charging circuit.

BACKGROUND

In recent years, secondary batteries (also known as rechargeable batteries) have been widely used in various portable electric devices and electronic devices such as toys and handheld devices. This has imposed an increasingly high requirement on energy storage of secondary batteries. Lithium-ion secondary batteries have been increasingly used in such areas due to their advantages such as having a high energy, being capable of high-power discharge, and being environmentally friendly.

For normal operation, rechargeable batteries often have to cooperate with integrated circuit chips with other functions to achieve desirable operation effects. Usually, the rechargeable batteries are packaged separately from the integrated circuit chips and then connected with them for use in combination through circuit boards and wires. Such products include a large number of peripheral components, require many manufacture processes, and have a high cost. Also, the rechargeable batteries and integrated circuit chips have a large volume and a poor performance, which is not beneficial for the miniaturization.

In packaging a lithium ion secondary battery, each component of the lithium ion secondary battery occupies a relatively fixed space. The positive plate, the isolation diaphragm, and the negative plate are arranged inside the polymer battery cell, and the end of the positive plate facing away from the isolation diaphragm is packaged by a battery cell top seal of a predefined height. As the battery cell top seal occupies a certain height of the polymer battery cell, the usable space inside the polymer battery cell is reduced. The space utilization of a polymer battery cell is substantially related to the energy density and capacity of the lithium ion secondary battery. Generally, the larger the space utilization of the polymer battery cell is, the higher the energy density and capacity of the lithium ion secondary battery is. Therefore, existing lithium ion secondary batteries all suffer from the problems of a low energy density and capacity due to the low space utilization of the polymer battery cell.

SUMMARY

The present invention provides an electrochemical secondary battery having an inbuilt charging circuit, including a battery housing, a battery cell, a positive electrode cap, a negative electrode cap, a circuit board module, and an insulating washer. A recessed loop line structure is provided at an end of the battery housing in proximity to the negative electrode cap. The battery cell is arranged within the battery housing and positioned between the positive electrode cap and the loop line structure. The battery housing is used for outputting the positive electrode and fixing the circuit board module. The positive electrode cap is connected to the battery housing to constitute the positive electrode of the secondary battery. The negative electrode cap is arranged on the circuit board module to provide electromagnetic shielding, electrostatic shielding, and heat dissipation for the circuit. The circuit board module is arranged between the loop line and the negative electrode cap. The circuit board module is configured with the diameter thereof being sized between the inner diameter of a recess constituted by the loop line and the inner diameter of the battery housing, thus being engaged at either end of the loop line and separated from the battery cell. Electrode connecting wires are arranged on the battery cell to lead out the positive and negative electrodes of the battery respectively. At least one through hole is provided on the circuit board module. An electrically-conductive material is coated onto the inner surface of the through hole for enhancing the welding strength and increasing the electrical contact area and leading out the electrode connecting wires so as to be connected to the circuit board module. The circuit board module can provide charging protection and charging indication for the battery as well as discharge protection, short-circuit protection, over discharge protection, and output voltage control for the battery. The insulating washer is arranged in a gap between both the battery housing and the circuit board module and the negative electrode cap, thus pressingly fixing the circuit board module between the loop line and the battery housing, and separating the battery housing from the negative electrode cap.

Preferably, the battery housing is a steel case of a cylinder or cuboid shaped structure.

Preferably, the circuit board module is at least one printed circuit board.

Preferably, the insulating washer is an annular insulating padding layer that is flexible and elastic.

Preferably, the insulating washer has a ⅂ shaped section. One segment of the ⅂ shape is used to pressingly fix the circuit board module between the loop line and the battery housing, and the other segment of the ⅂ shape is used to separate the battery housing from the negative electrode cap.

Preferably, a connector is provided on the circuit board module to fix the negative electrode cap onto the circuit board module and provide an electrical connection between them.

Preferably, the circuit board module is connected with the negative electrode cap by means of welding.

Preferably, at least two clamp protrusions are provided at an edge of the negative electrode cap for fixing the negative electrode cap onto the circuit board module. At least two clamp slots are provided on a side of the circuit board module facing the negative electrode cap at a location corresponding to the edge of the negative electrode cap for mounting of the negative electrode cap.

Preferably, the loop line is recessed to a depth of 0.2-1.2 mm relative to the surface of the battery housing.

Preferably, the positive electrode cap is integrally formed with the battery housing.

The sealing fitting for an electrochemical battery according to the present invention has a cleverly and reasonably designed structure in that the sealing region of the electrochemical battery electrode has a negative electrode cap which can cooperate with the circuit board to form a shielding structure capable of preventing internal high frequency components from causing interference to the external environment and conducting the heat generated by the circuit board during its operation to the external environment, thereby capable of protecting the circuit board and the components. Further, a loop line structure is arranged in the battery housing between the battery cell and the circuit board to position the battery cell and the circuit board relative to each other, and to cooperate with the insulating washer between the negative electrode cap and the battery housing to fix the circuit board without any welding.

BRIEF DESCRIPTION OF THE DRAWINGS

Further objects, functions, and advantages of the present invention shall become apparent from the description below of embodiments of the present invention with reference to accompanying figures, of which FIG. 1A shows schematically a schematic structural view of an electrochemical battery according to the present invention;

FIG. 1B is an exploded perspective view of the electrochemical battery according to the present invention;

DETAILED DESCRIPTION

Figure 1C:
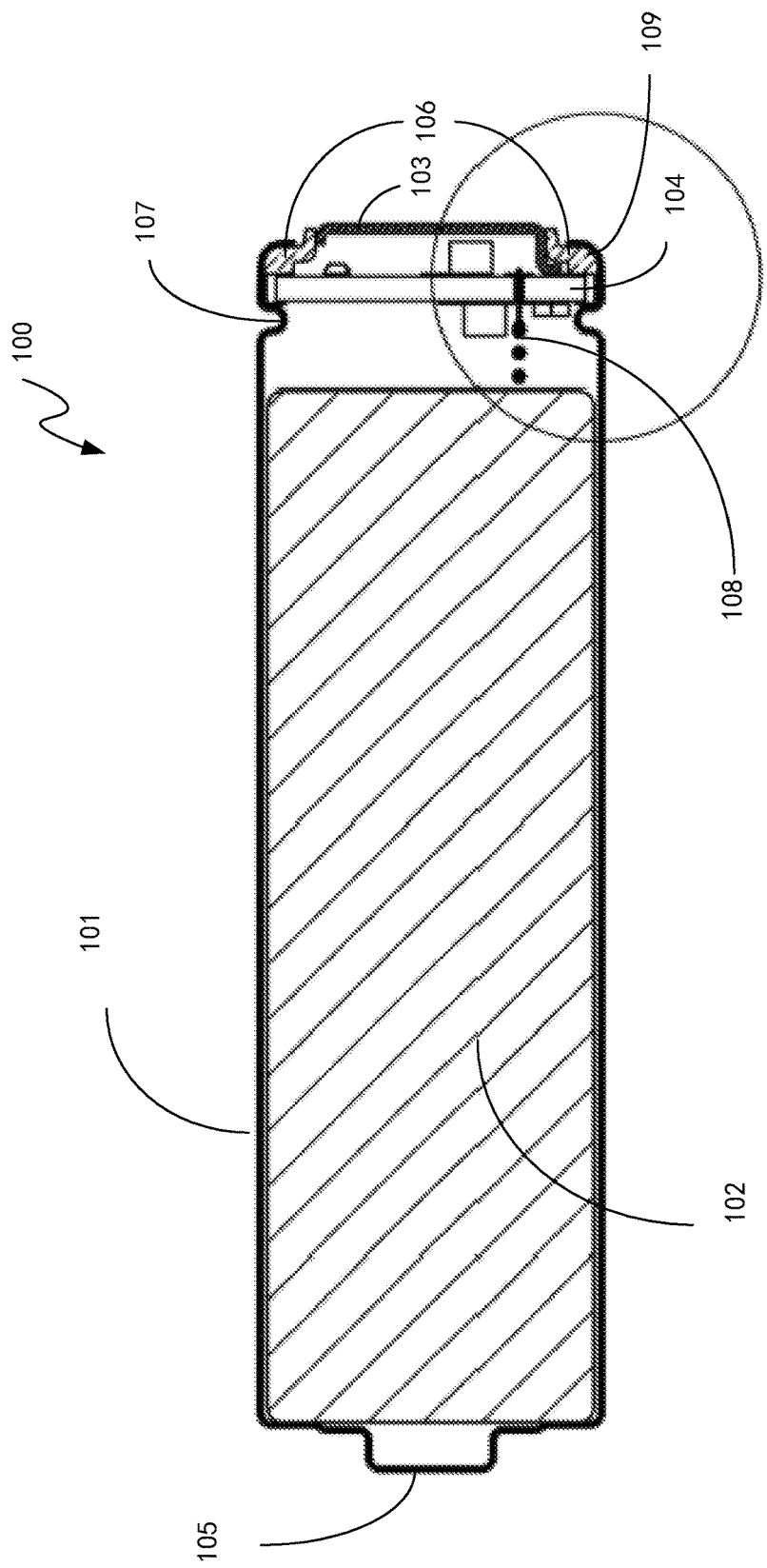
FIG. 1C is a sectional view taken along the line A-A in FIG. 1A.

With reference to exemplary embodiments, objects and functions of the present invention as well as methods for achieving them shall be explained. However, the present invention is not to be limited by the exemplary embodiments disclosed below, but can be realized in various forms. The specification is intended in nature solely to provide a thorough understanding of specific details of the present invention to those skilled in the art.

It shall be understood that the general description above and detailed description below are only an exemplary explanation and illustration and shall not be understood as limitations on the protection scope claimed by the present invention.

In the following, embodiments of the present invention will be described with reference to the accompanying drawings. In the accompanying drawings, like reference numerals refer to like or similar parts, or like or similar steps.

The present invention provides an electrochemical secondary battery. FIGS. 1A and 1B are respectively a schematic structural view and an exploded perspective view of an electrochemical secondary battery according to the present invention. As shown in FIGS. 1A and 1B, an electrochemical battery 100 includes a battery housing 101, a battery cell 102 positioned within the battery housing 101, a negative electrode cap 103, a circuit board module 104 positioned in a space between the battery cell 102 and the negative electrode cap 103, and a positive electrode cap 105. The negative electrode cap of the present invention provides electromagnetic shielding, electrostatic shielding, and heat dissipation for the circuit. The battery cell 102 is housed in the battery housing 101. The battery housing 101 is a steel case of a cylinder or cuboid shaped structure for outputting a positive electrode and fixing the circuit board module 104. According to an embodiment of the present invention, the positive electrode cap 105 is rotated to the right so as to be integrally formed with the battery housing 101.

The circuit board module 104 is at least one layer of printed circuit board (PCB) with a first side and a second side. The first side is directed towards the negative electrode cap 103 relative to the electrochemical battery 100, and the second side is directed towards the battery cell 102 relative to the electrochemical battery 100. The PCB is a circuit board having a wiring pattern printed thereon and is of a size substantially corresponding to an inner diameter of the housing for the battery 100. A plurality of printed wires and components are arranged on the first side or second side of the circuit board module 104. The circuit board module 104 is in proximity to the side of the negative electrode cap 103 of the battery 100 and positioned between the battery cell 102 and the negative electrode cap 103. A connector is provided on the circuit board module 104 for fixing the negative electrode cap 103 onto the circuit board module 104. For example, the negative electrode cap 103 may be fixed onto the circuit board module 104 be means of welding or alternatively by means of clamping and the like. The circuit board module provides charging protection and charging indication for the lithium battery as well as discharge protection, short circuit protection, over discharge protection, and output voltage control for the battery. Electrode connecting wires 108a and 108b are provided between the circuit module 104 and the battery cell 102 for leading out respectively the positive and negative electrodes of the battery. The connecting wire for the positive electrode is denoted as 108a and the connecting wire for the negative electrode is denoted as 108b. FIG. 1C is a sectional view taken along the line A-A in FIG. 1A. An insulating washer 106 is provided between the circuit board module 104 and the outside of the battery housing 101, and between the negative electrode cap 103 and the battery housing 101. The insulating washer 106 is an annular insulating padding layer that is flexible and elastic and has a ⊓ shape along the A-A section of the electrochemical battery 101. The insulating washer 106 can separate the battery housing 101 that serves as a first electrode from the negative electrode cap 103 that serves as a second electrode, and can press and fix the circuit board module 104 with the elasticity of the insulating padding layer 106 to seal the gap between the battery housing 101 and the negative electrode cap 103. Particularly, as shown in FIG. 1C, one segment of the ㅎ shape is used to pressingly fix the circuit board module 104 between the loop line 107 and the battery housing 101, and the other segment of the ㅎ shape is used to separate the battery housing 101 from the negative electrode cap 103.

A loop line 107 is formed as an annular inward recess on an outer surface of the battery housing 101 at a location between the battery cell 102 and the printed circuit board 106. The battery cell 102 is arranged within the battery housing 101 and positioned between the positive electrode cap 105 and structure of the loop line 107. The insulating washer 106 and the loop line 107 are arranged in such a manner that the circuit board module 104 is fixed between the annular recess of the battery housing 101 and the bottom of the battery housing 101. Therefore, the battery housing 101 and the negative electrode cap 103 can be connected without any welding.

The structure of the loop line 107 is provided to position the circuit board module 104. Particularly, the circuit board module 104 is configured with the diameter thereof being sized between the inner diameter of the annular recess constituted by the loop line 107 and the inner diameter of the battery housing 101. To assemble the battery, the battery cell 102 is placed into the battery housing 101. Then the circuit board module 104 is mounted into the battery housing 101. The circuit board module 104 is sized so that it can be engaged onto the structure of the loop line 107, thereby avoiding contact with the battery cell 102. Then the battery housing 101 is separated from the negative electrode cap 103 through the insulating padding layer 106. As such, assembly of the battery 100 is completed. Such a structure allows the circuit board module 104 to form an enclosed space in the battery housing 101 for accommodating the battery cell 102 by means of the structure of the loop line 107 therefore the volume of the battery cell 102 and thus the capacity of the secondary battery can be increased. Preferably, the battery cell 102 has a sealed structure and can be operated by leading the positive and negative electrodes of the battery cell 102 out of the battery cell 102 so as to be connected to the positive and negative electrodes of the battery respectively.

Preferably, the loop line 107 is recessed to a depth of 0.2-1.2 mm relative to the surface of the battery housing 101.

Figures 2A, 2B:
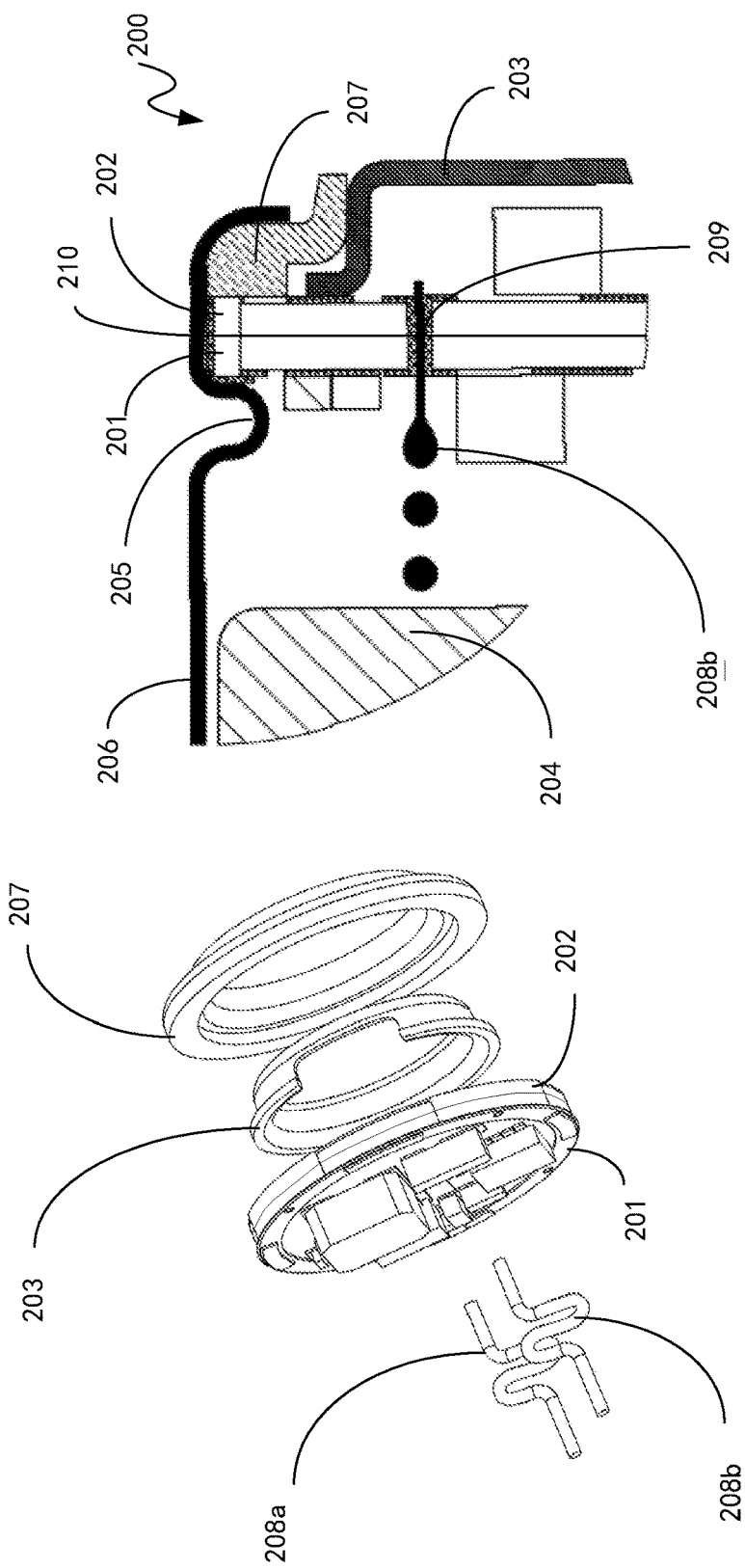
FIG. 2A shows schematically a schematic exploded structural stereogram of a sealing fitting 200 for an electrochemical secondary battery having an inbuilt charging circuit according to a first embodiment of the present invention.
FIG. 2B shows schematically a partial enlarged sectional view of the sealing fitting 200 for the electrochemical battery according to the first embodiment of the present invention.

FIG. 2A shows schematically an exploded perspective structural view of a sealing fitting 200 for the electrochemical secondary battery having a charging circuit according to the first embodiment of the present invention. FIG. 2B shows schematically a partial enlarged sectional view of the sealing fitting 200 for the electrochemical battery according to the first embodiment of the present invention. As shown in FIGS. 2A and 2B, the sealing fitting 200 includes a first PCB 201, a second PCB 202, and a negative electrode cap 203. According to an embodiment of the present invention, the first PCB 201 and the second PCB 202 are two printed circuit boards of the same area. The first PCB 201 is close to the battery cell 204, and the second PCB 202 is far away from the battery cell 204. The first PCB 201 is engaged onto the battery housing 206 through the loop line 205. The second PCB 202 and the negative electrode cap 203 are electrically connected through contact and constitute a shielding structure. The side of the first PCB 201 close to the battery cell 204 and the side of the second PCB 202 far away from the battery cell 204 have a plurality of chips or circuit components, of which components generating radiations during operation are arranged in the shielding structure constituted by the second PCB 202 and the negative electrode cap 203. A second insulating washer 207 is provided between both the PCB 202 and the outside of the negative electrode cap 203 and the battery housing 206. The insulating washer 207 is a flexible annular insulating padding layer that can pressingly fix the first PCB 201 and the second PCB 202 onto the loop line 205 in order to seal the gap between the battery housing 206 and the negative electrode cap. A tin coating 210 for enhancing contact is applied at the contact area between the battery housing 206 and the first and second PCBs, in order to seal the gap between the circuit board and the battery housing. By means of a through hole 209 between the first PCB and the second PCB, a negative electrode connecting wire 208b (and the positive electrode connecting wire denoted as 208a, which is not shown in the figure) led out of the battery cell 204 is connected with the wires on the first PCB and the second PCB. An electrically-conductive material such as copper coating is coated on the inner surface of the through hole 209 such that the wiring of a plurality of circuit boards can be connected by means of the through hole 209 and connected to the contact area between the negative electrode cap and the circuit board, thereby conducting it to the negative electrode cap.

Figure 3:
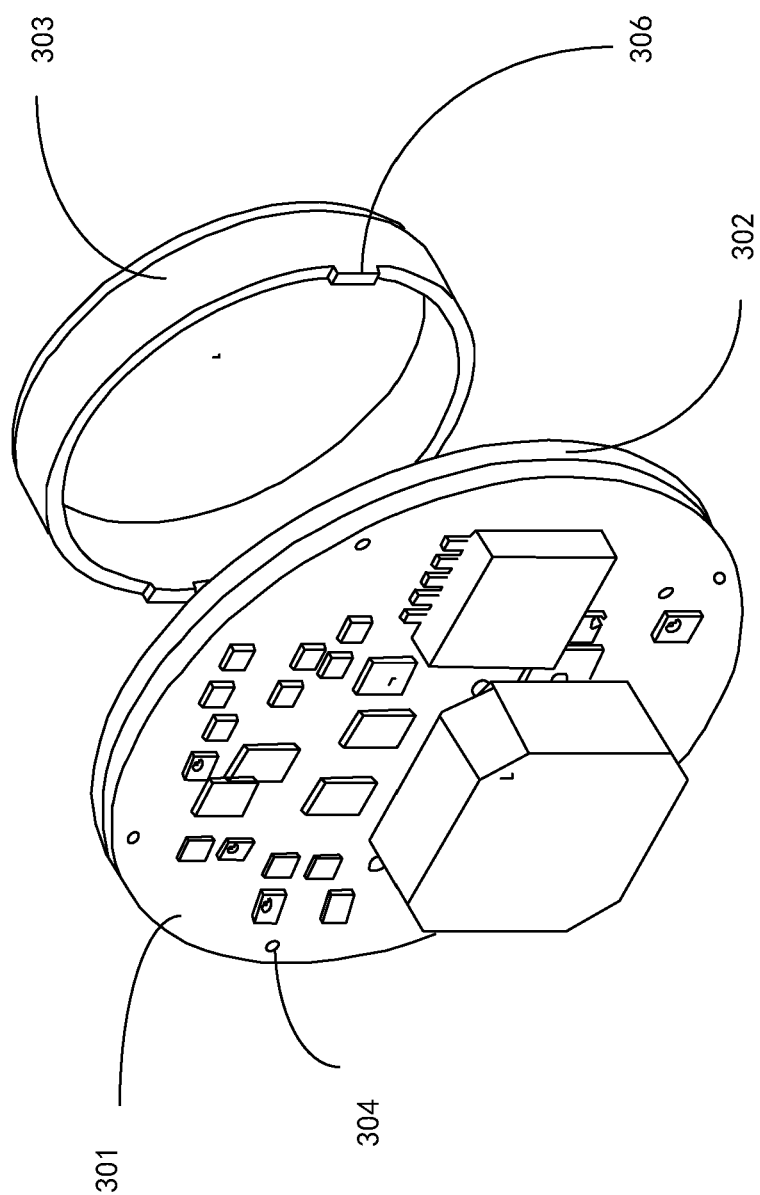
FIG. 3 is an exploded perspective view of a sealing fitting 300 for an electrochemical battery according to a second embodiment of the present invention.
Figure 4:
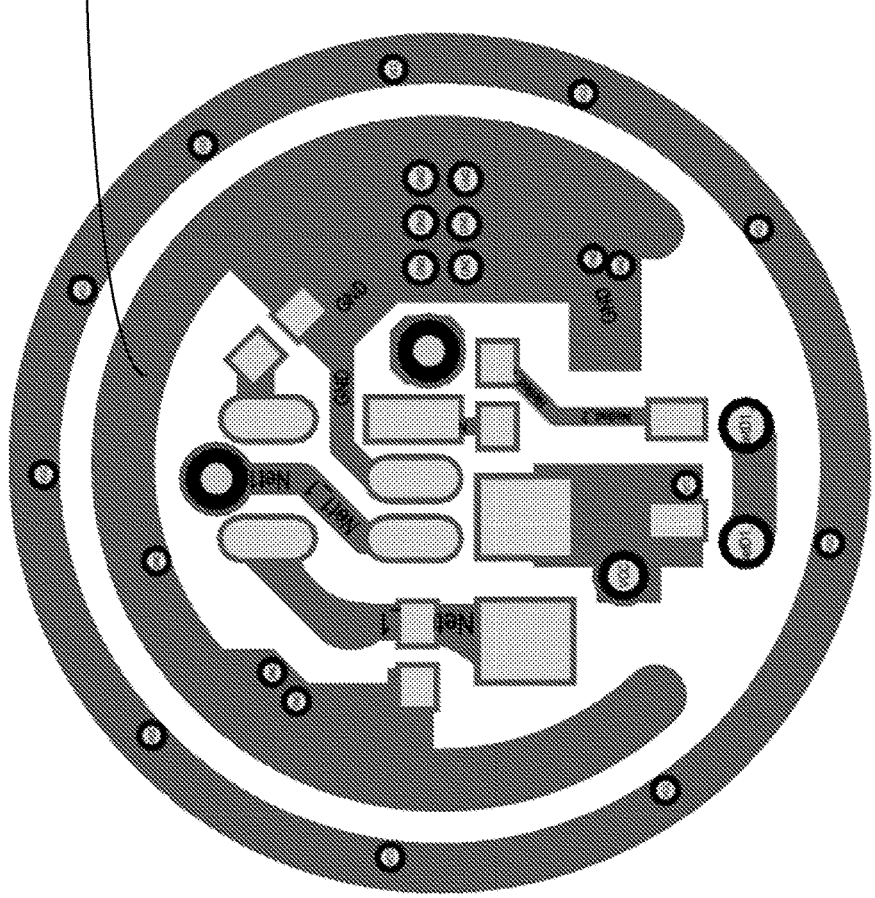
FIG. 4 is a schematic structural view of a second printed circuit board according to the second embodiment of the present invention.

FIG. 3 is an exploded stereogram of a sealing fitting 300 for an electrochemical battery according to a second embodiment of the present invention. The sealing fitting 300 includes a first PCB 301, a second PCB 302, and a negative electrode cap 303. The first PCB 301 and second PCB 302 have a plurality of circuit components arranged thereon. A plurality of holes 304 are provided on an edge of the first PCB 301 and the second PCB 302 for fixing the first PCB 301 and the second PCB 302 to each other. The side of the second PCB 302 connected to the negative electrode cap 303 has at least two clamp slots 305 (not shown) at a location corresponding to the edge of the negative electrode cap 303, and the edge of the negative electrode cap 303 has clamp protrusions 306 corresponding to the clamp slots 305 for fixing the negative electrode 303 onto the second PCB 302 and for electrical connection and thermal contact. The second PCB 302 is provided with a metal ring 401 (as shown in FIG. 4) at a portion in contact with the negative electrode cap 303. The negative electrode cap 303 can cooperate with the metal ring 401 to function as an electromagnetic shield. The negative electrode cap 303 is made of metal and can conduct the heat generated by the components on the circuit board during operation out of the battery through contact between the clamp slots 305 and the clamp protrusions 306, thereby providing heat dissipation.

The sealing fitting for an electrochemical battery according to the present invention has a cleverly and reasonably designed structure in that the sealing region of the electrochemical battery electrode has a negative electrode cap which can cooperate with the circuit board to form a shielding structure capable of preventing the internal high frequency components from causing interference to the external environment and conducting the heat generated by the circuit board during its operation to the external environment, thereby protecting the circuit board and the components. Further, a loop line structure is arranged on the battery housing between the battery cell and the circuit board to position the battery cell and the circuit board relative to each other, and to cooperate with the insulating washer between the negative electrode cap and the battery housing to fix the circuit board without any welding.

Other embodiments of the present invention can readily occur to and be understood by those skilled in the art in light of the description and practice of the invention disclosed herein. Such description and embodiments are solely meant to be illustrative and the true scope and spirit of the present invention shall be defined by the claims.

What is claimed is:

1. An electrochemical secondary battery having an inbuilt charging circuit, comprising: a battery housing, a battery cell, a positive electrode cap, a negative electrode cap, a circuit board module, and an insulating washer,
wherein a recessed loop line structure is provided at an end of the battery housing in proximity to the negative electrode cap, the battery cell is arranged within the battery housing and arranged between the positive electrode cap and the loop line structure, and the battery housing is used to output a positive electrode and fix the circuit board module;
the positive electrode cap is connected to the battery housing to constitute the positive electrode of the secondary battery;
the negative electrode cap is arranged on the circuit board module to provide electromagnetic shielding, electrostatic shielding, and heat dissipation for the circuit;
the circuit board module is arranged between the loop line and the negative electrode cap, and the circuit board module is configured with the diameter thereof being sized between an inner diameter of a recess constituted by the loop line and an inner diameter of the battery housing, thus being engaged at either end of the loop line and separated from the battery cell;
electrode connecting wires are arranged on the battery cell to lead out the positive and negative electrodes of the battery respectively; and
at least one through hole is provided on the circuit board module, an electrically-conductive material is coated onto an inner surface of the through hole for enhancing the welding strength and increasing the electrical contact area and leading out the electrode connecting wires so as to be connected to the circuit board module; the circuit board module can provide charging protection and charging indication for the battery as well as discharge protection, short-circuit protection, over discharge protection, and output voltage control for the battery; and the insulating washer is arranged in a gap between both the battery housing and the circuit board module and the negative electrode cap, thus pressingly fixing the circuit board module between the loop line and the battery housing, and separating the battery housing from the negative electrode cap.

2. The electrochemical battery according to claim 1, wherein the battery housing is a steel case of a cylinder or cuboid shaped structure.

3. The electrochemical battery according to claim 1, wherein the circuit board module is at least one printed circuit board.

4. The electrochemical battery according to claim 1, wherein the insulating washer is an annular insulating padding layer that is flexible and elastic.

5. The electrochemical battery according to claim 1, wherein the insulating washer has a ⌐ shaped section, one segment of the ⌐ shape being used to pressingly fix the circuit board module between the loop line and the battery housing, and other segment of the ⌐ shape being used to separate the battery housing from the negative electrode cap.

6. The electrochemical battery according to claim 1, wherein a connector is provided on the circuit board module to fix the negative electrode cap onto the circuit board module and provide an electrical connection between them.

7. The electrochemical battery according to claim 6, wherein the circuit board module is connected with the negative electrode cap by means of welding.

8. The electrochemical battery according to claim 6, wherein at least two clamp protrusions are provided at an edge of the negative electrode cap for fixing the negative electrode cap onto the circuit board module, and at least two clamp slots are provided on a side of the circuit board module facing the negative electrode cap at a location corresponding to the edge of the negative electrode cap for mounting of the negative electrode cap.

9. The electrochemical battery according to claim 1, wherein the loop line is recessed to a depth of 0.2-1.2 mm relative to the surface of the battery housing.

10. The electrochemical battery according to claim 1, wherein the positive electrode cap is integral to the battery housing.

* * * * *